July 16, 1929.  F. S. CALLENDER  1,721,293
METHOD OF MAKING BATTERY BOXES
Original Filed June 27, 1927
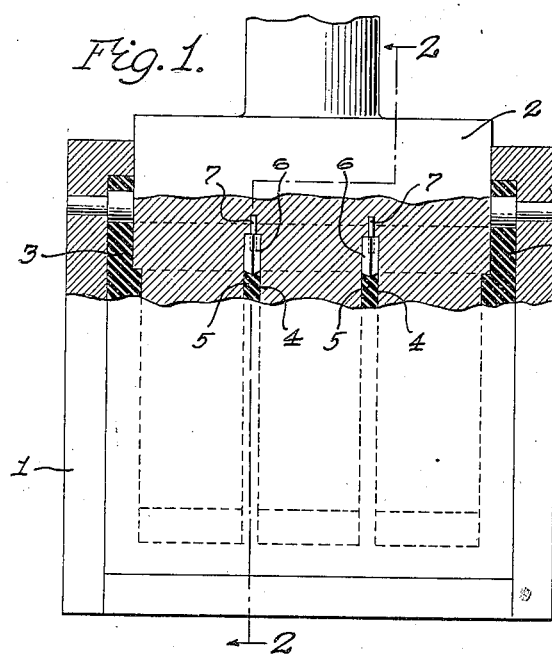
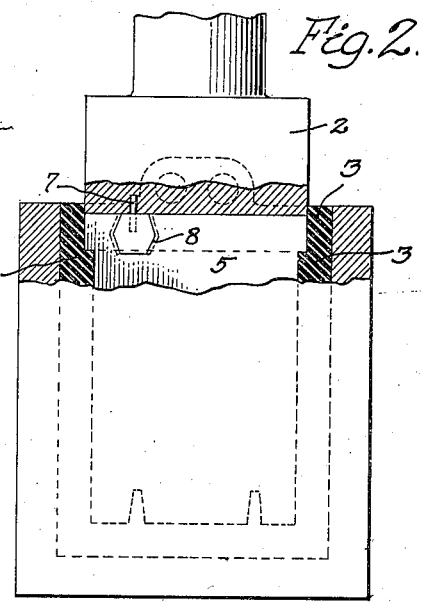
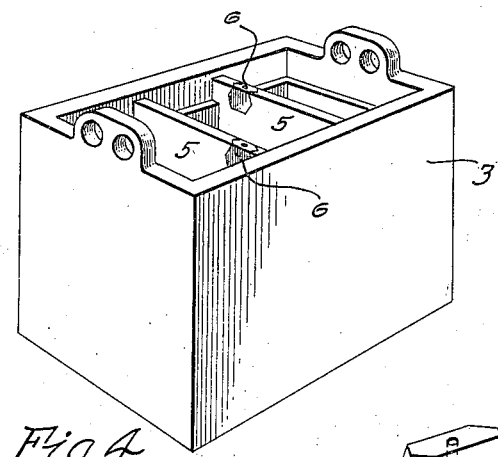
Fig. 4.
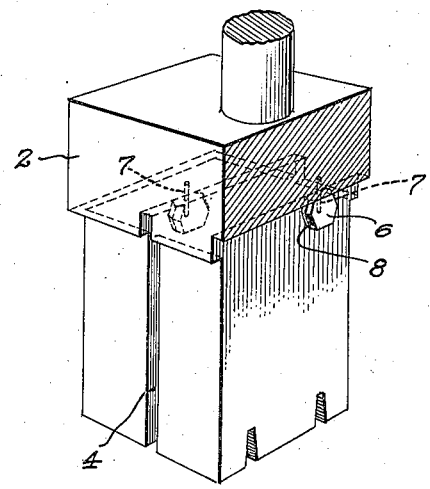
Fig. 3.
Inventor
Frank S. Callender,
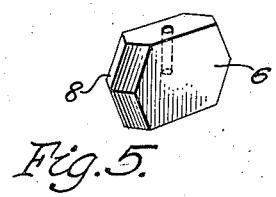
Fig. 5.
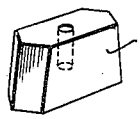
Fig. 6.
Attorneys Patented July 16, 1929.

1,721,293

UNITED STATES PATENT OFFICE.

FRANK S. CALLENDER, OF DETROIT, MICHIGAN.

METHOD OF MAKING BATTERY BOXES.

Original application filed June 27, 1927, Serial No. 201,878. Divided and this application filed May 25, 1928. Serial No. 280,499.

The present invention pertains to a novel method of making battery boxes, and this application is a division of my copending application, Serial No. 201,878, filed June 27, 1927.

The principal object of the invention is to provide a battery box wherein the connecting means between cells, or from battery to battery in the case of single cell batteries, is disposed beneath the top of the box. Such an arrangement dispenses with the usual heavy lead connectors above the cover and incidentally does away with the machinery for making these members.

The connector employed in the present invention consists merely of a conducting slug, preferably lead, inserted in the partition or wall of the cell and having the thickness of such partition or wall. Hence, the amount of lead or other conducting material required for such a slug is considerably less than that used in making the conventional lead link situated outside the cell.

This invention is directed more particularly to the manner in which the slug or conducting member is inserted in the cell partition or wall. I have found that the slug may be positioned during the operation of molding the battery box, as a result of which the slug may be said to be molded into the box. The usual method of making a battery box involves a matrix for containing plastic material which is formed to shape by means of a plunger that enters the matrix. The plunger has slots which form the partitions of the box, and into the top of these slots I releasably mount the conducting members which eventually become seated and are retained in the top of the partitions. The operation is facilitated by forming the slugs with end protuberances, for example in the nature of a downward flare, as a result of which the tendency of the slugs to withdraw from the partitions on retraction of the plunger is entirely overcome by the anchorage of the slugs in the plastic material and the adhesiveness of the latter material.

The invention is fully disclosed by way of example in the following description and in the accompanying drawings, in which—

Figure 1 is a sectional view showing a plunger received in a matrix in the operation of molding a battery box;

Fig. 2 is a section on the line 2—2 of Figure 1;

Fig. 3 is a sectional perspective view of the plunger, showing slugs or connecting members attached thereto;

Fig. 4 is a perspective view of a completed battery box according to the invention;

Fig. 5 is a perspective view of one of the slugs; and

Fig. 6 is a perspective view of a modified slug.

Reference to these views will now be made by use of like characters which are employed to designate corresponding parts throughout.

In Figures 1 and 2 is illustrated the conventional matrix 1 which cooperates with a suitably shaped plunger 2 to form a battery box from plastic material 3 contained in the matrix. This method is already well known and in use, and a detailed description thereof is therefore unnecessary here. It is to be observed however that the plunger is formed with vertical slots 4 which are entered by the plastic material under pressure and which thus form the intercell partitions 5.

It is desired to releasably mount the intercell connecting members in the partitions, for the reasons discussed above at length, and with this object in view I support such slugs or connecting members 6 in the top of the slots 4. The support is made releasable by means of a pin 7 having sufficient frictional engagement with both parts for supporting the slug, but of such degree as to be overcome by the adherence of the slug in the partition.

The slug is here shown as having pointed ends 8 in order to provide end protuberances which will be covered by the plastic material which molds itself above the same, so that the withdrawal of the slug from the partition on retraction of the plunger is effectively resisted and overcome. The slug may be formed in various ways to provide such end protuberances, and another desirable formation may consist, for example, of merely a downward flare as illustrated by the slug 6' in Figure 6. On withdrawal of the plunger from the matrix, the anchorage and adhesion of the slug to the plastic material overcome the frictional engagement of the pin 7 in the slug, so that the latter remains in the position shown in Figure 4. In the assembling of the battery the straps connecting alternate plates are merely burned to the faces of the conducting members or slugs.

As already stated, the invention is also applicable to single cell units, in which case the slugs are mounted in the lateral walls of the battery box. In this connection it is intended that the term "partition" shall include any of the lateral walls of a cell.

Although specific embodiments of the invention have been illustrated and described, it will be understood that various alterations in the details of construction may be made without departing from the scope of the invention as indicated by the appended claims.

What I claim is:—

1. In a method of molding a partitioned battery box by entering a plunger into a matrix containing moldable material, the operation consisting in releasably attaching a conducting member to said plunger for penetration into the partition and for exposure at opposite faces thereof.

2. In a method of molding a partitioned battery box by entering a plunger into a matrix containing moldable material, the operation consisting in releasably attaching a conducting member to said plunger for penetration into the partition entirely beneath the upper edge thereof and for exposure at opposite faces of said partition.

3. In a method of molding a partitioned battery box by entering a plunger into a matrix containing moldable material, the operation consisting in molding a conducting member in the partition during the molding of the box.

4. In the process of molding a battery box by means of a matrix and a slotted plunger to form a partitioned box, the operation consisting in supporting a conducting member in the top of the slot of the plunger and causing it to remain in the partition formed by said slot.

5. In the process of molding a battery box by means of a matrix and a slotted plunger to form a partitioned box, the operation consisting in supporting in the top of the slot of said plunger a conducting member having end protuberances. whereby said member remains embedded in the partition formed by said slot.

In testimony whereof I affix my signature.

FRANK S. CALLENDER.